(12) United States Patent　　(10) Patent No.:　US 12,558,983 B2
Kakuchi　　(45) Date of Patent:　Feb. 24, 2026

(54) POWER SHARING SYSTEM

(71) Applicant: TOYOTA JIDOSHA KABUSHIKI KAISHA, Aichi-ken (JP)

(72) Inventor: Makoto Kakuchi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 585 days.

(21) Appl. No.: 18/159,088

(22) Filed: Jan. 25, 2023

(65) Prior Publication Data

US 2023/0286402 A1　　Sep. 14, 2023

(30) Foreign Application Priority Data

Mar. 14, 2022　(JP) ................................. 2022-039461

(51) Int. Cl.
| | |
|---|---|
| *B60L 53/57* | (2019.01) |
| *B60L 53/16* | (2019.01) |
| *B60L 53/62* | (2019.01) |
| *B60L 53/66* | (2019.01) |

(52) U.S. Cl.
CPC .............. *B60L 53/57* (2019.02); *B60L 53/16* (2019.02); *B60L 53/62* (2019.02); *B60L 53/66* (2019.02)

(58) Field of Classification Search
CPC ........ H02J 7/0063; H02J 7/0068; H02J 7/342; B60L 53/16; B60L 53/14; B60L 53/18; B60L 53/53; B60L 53/57; B60L 53/62; B60L 53/65; B60L 53/66; Y02T 10/70; Y02T 10/7072; Y02T 90/14
See application file for complete search history.

(56) References Cited

U.S. PATENT DOCUMENTS

| | | | | |
|---|---|---|---|---|
| 2014/0184141 | A1* | 7/2014 | Loftus ....................... | B60L 3/00 |
| | | | | 320/104 |
| 2014/0312847 | A1* | 10/2014 | Chauhdary ........... | B60L 53/305 |
| | | | | 320/128 |
| 2016/0259008 | A1* | 9/2016 | Rueger ................... | B60L 58/12 |
| 2018/0272884 | A1* | 9/2018 | Kojima ................... | B60L 53/65 |
| 2020/0231058 | A1* | 7/2020 | Hishida ................... | B60L 55/00 |
| 2022/0396167 | A1* | 12/2022 | Sharifipour ............. | B60L 53/51 |
| 2023/0143398 | A1* | 5/2023 | Ito ........................... | B60L 53/53 |
| | | | | 320/109 |
| 2023/0356621 | A1* | 11/2023 | Bennett ................... | B60L 55/00 |

FOREIGN PATENT DOCUMENTS

JP　　　2013041324 A　　2/2013

* cited by examiner

*Primary Examiner* — Julian D Huffman
*Assistant Examiner* — Johali A Torres Ruiz
(74) *Attorney, Agent, or Firm* — HAUPTMAN HAM, LLP

(57)　　　　ABSTRACT

The power sharing system disclosed herein includes a plurality of power plugs connectable to a vehicle, the plurality of power plugs including a first power plug and a second power plug, a power regulator, and a controller. The power regulator includes an input terminal and an output terminal, and is a device that outputs power input to the input terminal to the output terminal. The controller connects the first power plug connected to the power providing vehicle providing power to the input terminal, and connects the second power plug connected to the charging requesting vehicle for charging to the output terminal. Power is transferred directly from the power providing vehicle to the charging requesting vehicle.

6 Claims, 7 Drawing Sheets

FIG. 2

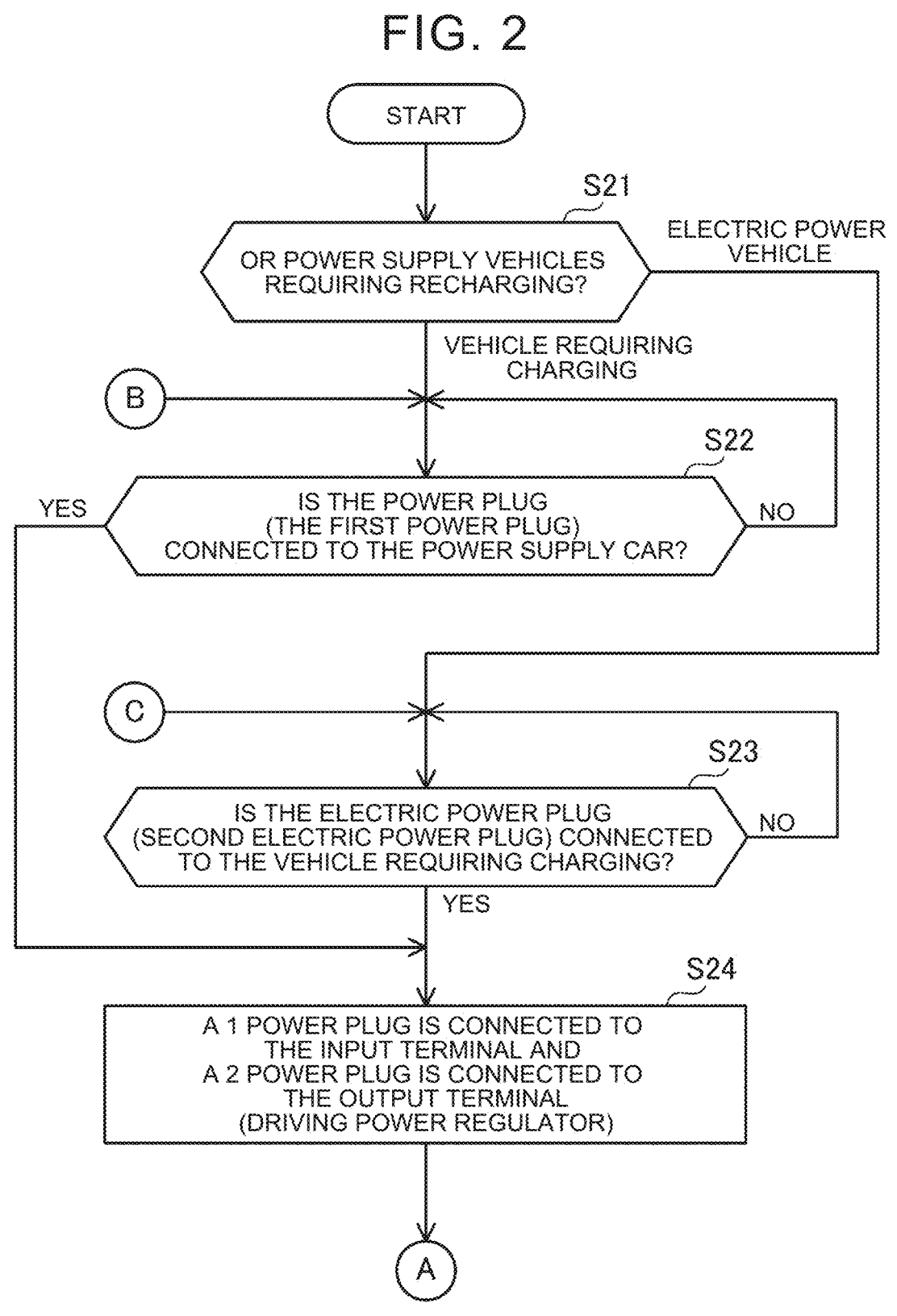

START

S21

OR POWER SUPPLY VEHICLES
REQUIRING RECHARGING?

ELECTRIC POWER
VEHICLE

VEHICLE REQUIRING
CHARGING

B

S22

YES

IS THE POWER PLUG
(THE FIRST POWER PLUG)
CONNECTED TO THE POWER SUPPLY CAR?

NO

C

S23

IS THE ELECTRIC POWER PLUG
(SECOND ELECTRIC POWER PLUG) CONNECTED
TO THE VEHICLE REQUIRING CHARGING?

NO

YES

S24

A 1 POWER PLUG IS CONNECTED TO
THE INPUT TERMINAL AND
A 2 POWER PLUG IS CONNECTED TO
THE OUTPUT TERMINAL
(DRIVING POWER REGULATOR)

Figure 4:
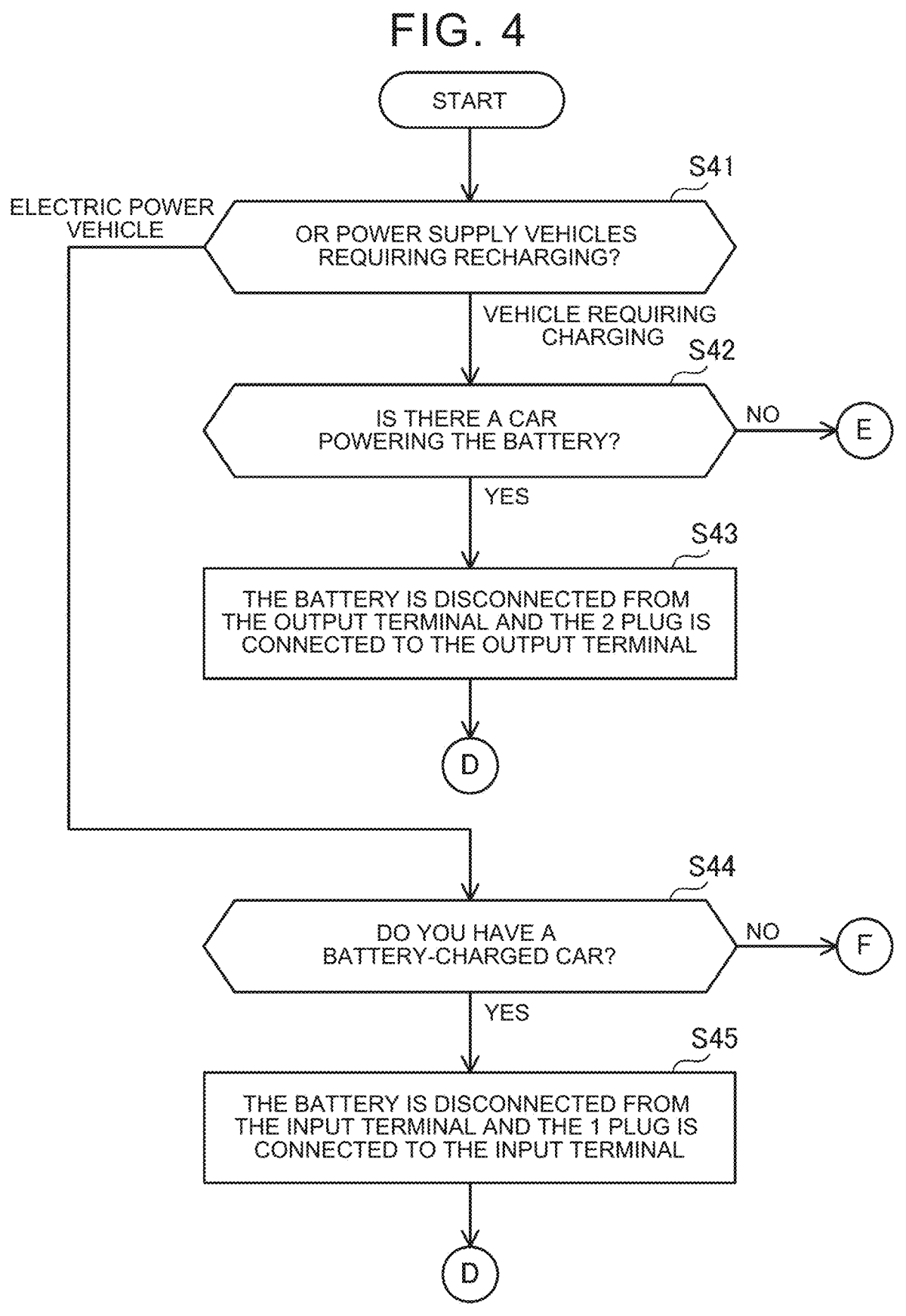

START

S41

ELECTRIC POWER VEHICLE

OR POWER SUPPLY VEHICLES REQUIRING RECHARGING?

VEHICLE REQUIRING CHARGING

S42

IS THERE A CAR POWERING THE BATTERY?

NO → E

YES

S43

THE BATTERY IS DISCONNECTED FROM THE OUTPUT TERMINAL AND THE 2 PLUG IS CONNECTED TO THE OUTPUT TERMINAL

D

S44

DO YOU HAVE A BATTERY-CHARGED CAR?

NO → F

YES

S45

THE BATTERY IS DISCONNECTED FROM THE INPUT TERMINAL AND THE 1 PLUG IS CONNECTED TO THE INPUT TERMINAL

Figure 7:
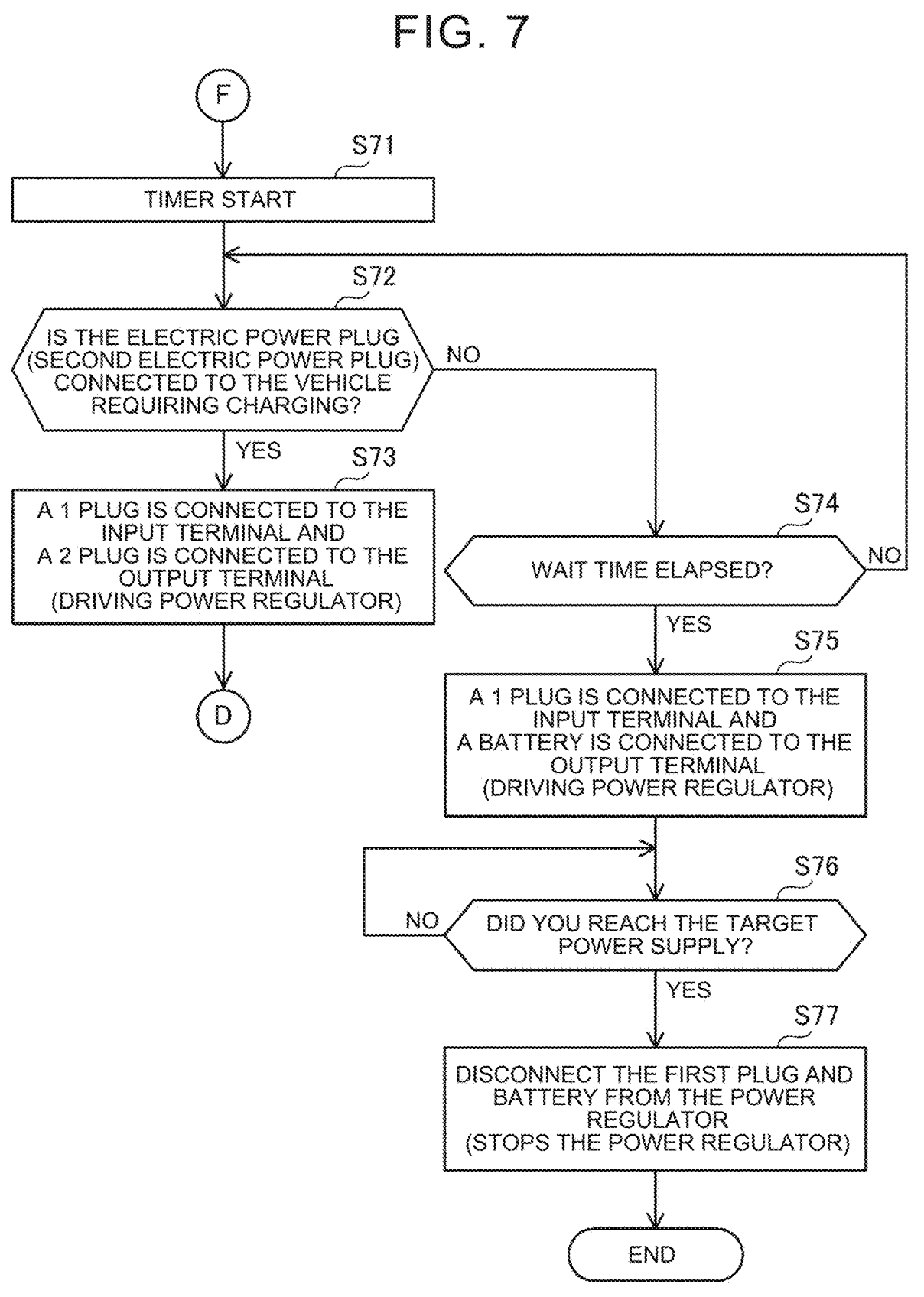

S71
TIMER START

S72
IS THE ELECTRIC POWER PLUG (SECOND ELECTRIC POWER PLUG) CONNECTED TO THE VEHICLE REQUIRING CHARGING?

NO →

YES ↓

S73
A 1 PLUG IS CONNECTED TO THE INPUT TERMINAL AND
A 2 PLUG IS CONNECTED TO THE OUTPUT TERMINAL
(DRIVING POWER REGULATOR)

(D)

S74
WAIT TIME ELAPSED?

NO →

YES ↓

S75
A 1 PLUG IS CONNECTED TO THE INPUT TERMINAL AND
A BATTERY IS CONNECTED TO THE OUTPUT TERMINAL
(DRIVING POWER REGULATOR)

S76
NO ← DID YOU REACH THE TARGET POWER SUPPLY?

YES ↓

S77
DISCONNECT THE FIRST PLUG AND BATTERY FROM THE POWER REGULATOR
(STOPS THE POWER REGULATOR)

END

POWER SHARING SYSTEM

CROSS-REFERENCE TO RELATED APPLICATION

This application claims priority to Japanese Patent Application No. 2022-039461 filed on Mar. 14, 2022, incorporated herein by reference in its entirety.

BACKGROUND

1. Technical Field

The technology disclosed in the present specification relates to a power sharing system that supports power transfer between vehicles.

2. Description of Related Art

Vehicles equipped with a power supply for supplying electric power to an electric motor for traveling have become popular. The on-board power supply is mainly a rechargeable battery, but may be a power generation device such as a fuel cell.

An automobile equipped with a battery has to charge the battery when the remaining capacity of the battery is reduced. Japanese Unexamined Patent Application Publication No. 2013-41324 (JP 2013-41324 A) discloses an example of a charging station. The charging station of JP 2013-41324 A can supply electric power from a battery to a vehicle of a user who desires to perform charging. On the other hand, the charging station receives electric power from a vehicle of a user who is willing to provide electric power, and charges the battery.

SUMMARY

In the charging station of JP 2013-41324 A, since electric power is frequently transferred into and out from the battery, the battery may deteriorate quickly. The present specification provides a power sharing system that supports direct power transfer between vehicles by not using a battery or by reducing the use time of the battery.

A power sharing system disclosed in the present specification includes: a plurality of power plugs connectable to an automobile; a power regulator; and a controller. For convenience of explanation, one of the power plugs is referred to as a first power plug, and another is referred to as a second power plug. Here, "first"/"second" is used to clarify that the two power plugs are different, and does not mean a specific power plug.

The power regulator includes an input terminal and an output terminal and outputs electric power input to the input terminal to the output terminal. The controller connects the first power plug connected to a power providing vehicle to the input terminal and connects the second power plug connected to a charging request vehicle to the output terminal. The power providing vehicle is a vehicle that provides electric power of a power supply of an own vehicle, and the charging request vehicle is a vehicle that requests charging. The technology disclosed in the present specification can support direct power transfer between vehicles without using a battery.

When there is a charging request vehicle but there is no power providing vehicle, it is disadvantageous that the charging request vehicle cannot obtain electric power. Therefore, the power sharing system disclosed in the present specification may include a battery. In this case, when the controller detects that the charging request vehicle is connected to the second power plug but the power providing vehicle is not connected to the first power plug, the controller may connect the battery to the input terminal and connect the second power plug connected to the charging request vehicle to the output terminal. This ensures that the charging request vehicle can obtain electric power.

When the controller detects that the charging request vehicle is connected to the second power plug but the power providing vehicle is not connected to the first power plug, the controller may connect the battery to the input terminal and connect the second power plug connected to the charging request vehicle to the output terminal after a predetermined standby time has elapsed. If a power providing vehicle appears during the predetermined standby time, the charging request vehicle can obtain electric power without using the battery.

When the controller detects that the power providing vehicle is connected to the first power plug after connecting the battery to the input terminal, the controller may disconnect the battery from the input terminal and connect the first power plug to which the power providing vehicle is connected to the input terminal. If a power providing vehicle appears even during charging using the battery, charging from the battery is switched to charging from the power providing vehicle. Thus, the use time of the battery can be reduced. That is, deterioration of the battery can be suppressed.

In the above expression, the same effect can be obtained even if the "charging request vehicle" and the "power providing vehicle" are replaced, the "first" and the "second" are replaced, and the "input terminal" and the "output terminal" are replaced. In the power sharing system disclosed in the present specification, even if a battery is employed, the use time of the battery can be reduced as much as possible.

A charging request vehicle that has finished charging the desired electric power does not correspond to the "charging request vehicle", and a power providing vehicle that has finished providing the desired electric power does not correspond to the "power providing vehicle" even if the power plug is connected thereto. In other words, the controller excludes the power plug connected to the charging request vehicle that has finished charging the desired electric power or the power providing vehicle that has finished providing the desired electric power, from an object to be connected to the power regulator. In addition, if multiple power plugs can be connected to multiple power regulators, the controller detects the first power plug that is connected to a power providing vehicle and that is not yet connected to any power regulator and the second power plug that is connected to a charging request vehicle and that is not yet connected to any power regulator, as the power plugs that are to be newly connected to the power regulators.

Details and further improvements of the technology disclosed in the present specification are described in the DETAILED DESCRIPTION OF EMBODIMENTS below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart of a power sharing process executed by a controller of the power sharing system according to the first embodiment (1);

FIG. 4 is a flowchart of a power sharing process executed by a controller of the power sharing system according to the second embodiment (1);

FIG. 7 is a flowchart of a power sharing process executed by a controller of the power sharing system according to the second embodiment (4).

DETAILED DESCRIPTION OF EMBODIMENTS

Example 1

Figure 1:
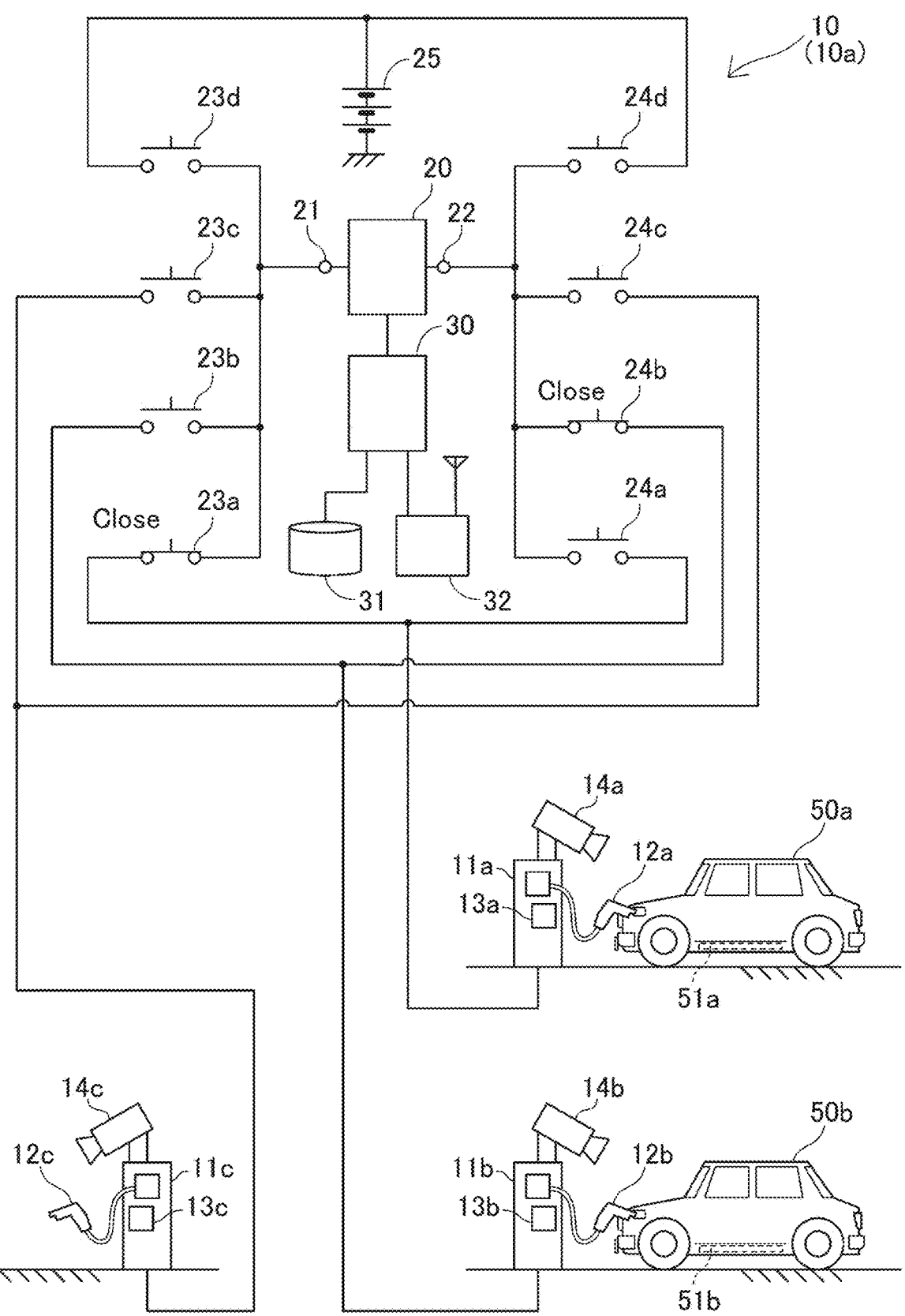
FIG. 1 is a block diagram of a power sharing system according to an embodiment.

The power sharing system 10 of the first embodiment will be described with reference to the drawings. FIG. 1 shows a block diagram of a power sharing system 10. The power sharing system 10 is a system that supports transmission and reception of electric power between vehicles. In other words, the power sharing system 10 connects the vehicle (power providing vehicle) of the user who has offered to provide the power of the own vehicle and the vehicle (charging requesting vehicle) of the user who requests charging, and charges the battery of the charging requesting vehicle with the power supply of the power providing vehicle. As described above, in the following description, the vehicle of the user who has offered to provide the electric power of the own vehicle is referred to as an electric power providing vehicle, and the vehicle of the user who requests charging is referred to as a charging request vehicle in some cases.

Note that the "automobile" in the embodiment means a vehicle provided with an electric motor for traveling. That is, the "automobile" in the embodiment includes not only an automobile equipped with a battery but also an automobile equipped with a fuel cell, and a hybrid electric vehicle equipped with an electric motor and an engine. The charging request vehicle includes an automobile including a battery, and also includes an automobile including a fuel cell together with the battery.

The power sharing system 10 of the embodiment includes three stations 11a-11c, a power regulator 20, and a controller 30. Although a battery 25 is depicted in FIG. 1, the power sharing system 10 of the first embodiment does not use the battery 25. The power sharing system 10a of the second embodiment described later utilizes the battery 25.

Each station 11 (11a-11c) comprises a power plugging 12 (12a-12c). The power plug 12 is connectable to a vehicle. A user who wishes to charge his or her vehicle's battery, or who may divide the power of his or her vehicle's power supply into others, stops his or her vehicle next to any station 11 and connects the power plug 12 to the power socket of his or her vehicle. The power plug 12 only has a function of electrically connecting the power supply of the vehicle and the power regulator 20 (described later), and can conduct electric power bidirectionally.

The respective power plugs 12 (12a-12c) are connected via an input relay 23 (23a-23c) to the input terminal 21 of the power regulator 20 and via an output relay 24 (24a-24c) to the output terminal 22 of the power regulator 20. Although the power plug 12 and the ground end of the power regulator 20 are always connected to each other, the ground end is not shown.

The power regulator 20 is a voltage converter. The power regulator boosts the voltage applied to the input terminal 21 and supplies the voltage to the output terminal 22 so that power (current) always flows from the input terminal 21 to the output terminal 22. For example, when a 12-volt battery having a large remaining power amount is connected to the input terminal 21 and a 24-volt battery having a small remaining power amount is connected to the output terminal 22, the power regulator 20 boosts the voltage at the input terminal 21 to a voltage exceeding 24 volts and supplies the voltage to the output terminal 22. As a result, electric power is supplied from a 12 volt battery connected to the input terminal 21 to a 24 volt battery connected to the output terminal 22.

Alternatively, when a 24 volt battery with a high remaining power is connected to the input terminal 21 and a 12 volt battery with a low remaining power is connected to the output terminal 22, the power regulator 20 steps down the voltage at the input terminal 21 to a voltage slightly greater than 12 volts and supplies the voltage to the output terminal 22. As a result, electric power is safely supplied from a 24 volt battery connected to the input terminal 21 to a 12 volt battery connected to the output terminal 22.

The power regulator 20 is, in other words, a device that transmits electric power from an electric device (a power supply of a vehicle) connected to the input terminal 21 to an electric device (a battery of a vehicle) connected to the output terminal 22.

The controller 30 connects the power plug 12 to which the vehicle of the user requesting charging (charging requesting vehicle) is connected and the output terminal 22 of the power regulator 20, and connects the power plug 12 to the input terminal 21 of the power regulator 20 even when the vehicle of the user who offered to provide power using the power source of the own vehicle (power providing vehicle) is connected. The controller 30 then drives the power regulator 20 (i.e., voltage converter) so that power flows from the input terminal 21 to the output terminal 22.

In the embodiment of FIG. 1, the controller 30 closes the input relay 23a between the power plug 12a and the input terminal 21 because the vehicle 50a connected to the power plug 12a is a power providing vehicle. Other input relays 23b, 23c, (23d) remain open. In addition, the controller 30 closes the output relay 24b between the power plug 12b and the output terminal 22 because the vehicle 50b connected to the power plug 12b is a vehicle requiring charge. Other output relays 24a, 24c, (24d) remain open. The controller 30 drives the power regulator 20 so that power flows from the input terminal 21 to the output terminal 22. In this way, the battery 51b of the vehicle requiring charging (vehicle 50b) is charged by the power supply 51a of the vehicle providing power (vehicle 50a).

The power sharing system 10 may include four or more stations 11 (power plugs 12). In addition, the power sharing system 10 may include a plurality of power regulators 20. In this case, each of the power plugs 12 is connected to an input terminal of each of the plurality of power regulators via an input relay, and is connected to an output terminal via an output relay. One input relay is connected between one power plug and one input terminal, and one output relay is connected between one power plug and one output terminal.

Each station 11 is provided with an input device 13 (13a-13c), and the user operates the input device 13 to select whether to require charging or provide power, and to input a target power quantity. For convenience of explanation, the target power amount when charging is requested is referred to as the target charge amount, and the power amount when power is provided is referred to as the target power supply amount.

The respective stations 11 are also provided with a camera 14 (14a-14c for reading the identification of the stopped vehicle (vehicle number). The information input to the input device 13 and the information acquired by the camera 14 are sent to the controller 30 of the power sharing system 10.

Further, the power plug 12 is provided with a connection sensor for detecting the connection of the vehicle, and when the vehicle is connected to the power plug 12, the information is notified to the controller 30. That is, the controller 30 can detect that the vehicle is connected to the power plug 12.

A storage device 31 and a communication device 32 are connected to the controller 30, and information of a user of the power sharing system 10 (an identifier of a user's vehicle, a target charge amount, a target power supply amount, and the like) is stored in the storage device 31. The controller 30 may also receive information of a user (a user's vehicle) via the communication device 32.

The controller 30 stops the power regulator 20 and electrically disconnects the power plug 12 connected to the vehicle from the power regulator 20 when the target power supply amount or the target charge amount of the vehicle connected to the power plug 12 is satisfied. In other words, the controller 30 stops the power regulator 20 and opens a relay between the power plug 12 connected to the vehicle and the power regulator 20 when the target power supply or the target charge is satisfied.

Power is exchanged between the power providing vehicle and the charging request vehicle via the power regulator 20, and even if the target amount of charge (or the target amount of power supply) is satisfied, the target amount of power supply (or the target amount of charge) may not be satisfied. When there is a vehicle in which the target charge amount (or the power supply request amount) is not satisfied, the controller 30 monitors the states of the plurality of power plugs 12 in order to compensate for the shortage, and searches for the next power providing vehicle (or the next charging request vehicle). With multiple power plugs 12 and multiple power regulators 20, the power sharing system 10 can support power sharing by multiple vehicles.

Figure 3:
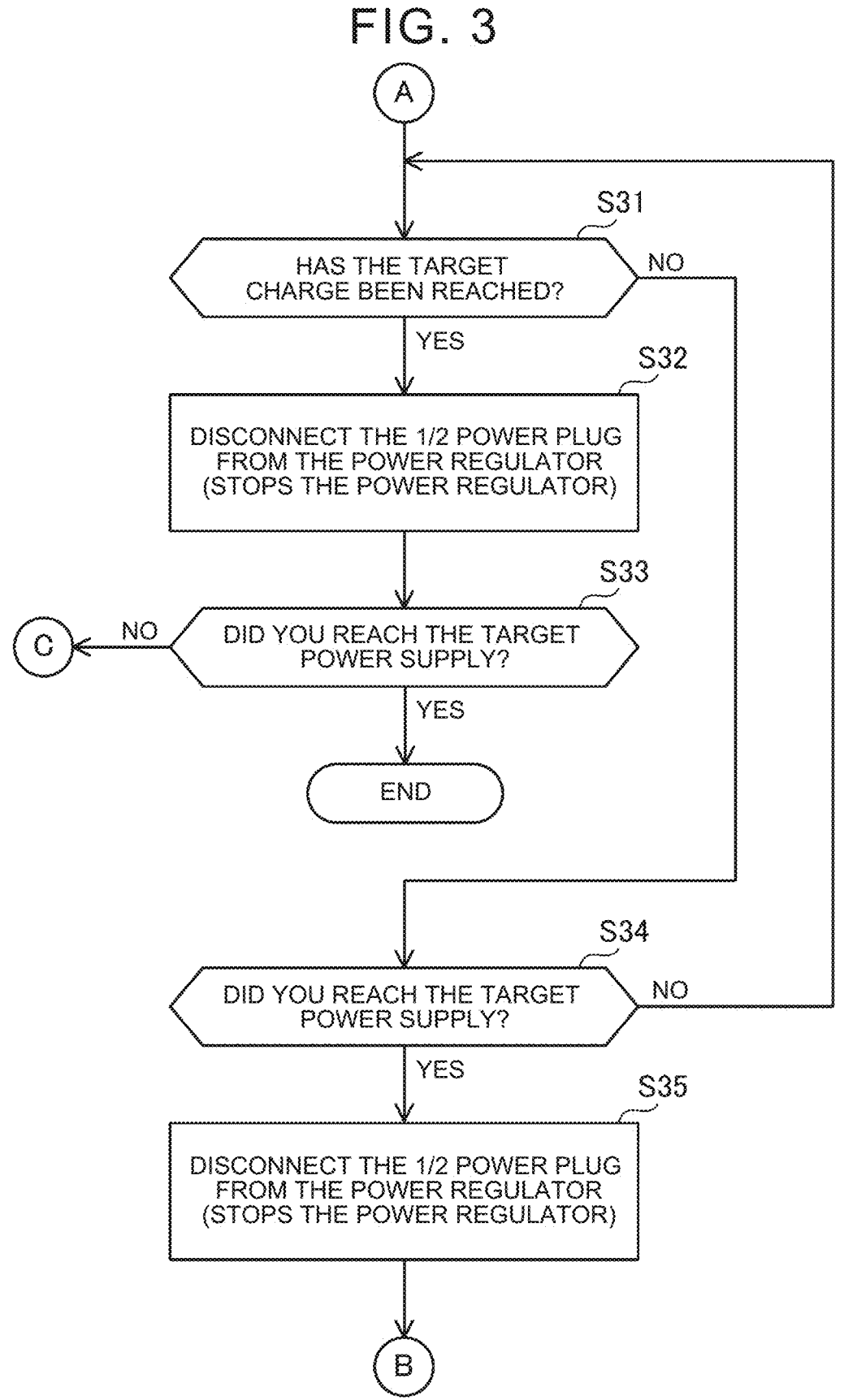
FIG. 3 is a flowchart of a power sharing process executed by a controller of the power sharing system according to the first embodiment (2)

FIG. 2 and FIG. 3 show a flowchart of the power sharing process. The power sharing process performed by the controller 30 will be described with reference to FIGS. 2 and 3. In the following description, the power plug 12 connected to the power providing vehicle is referred to as a first power plug, and the power plug 12 connected to the charging request vehicle is referred to as a second power plug.

As described above, the user inputs the identifier (vehicle number) of the own vehicle and the offer of the charging request or the offer of the power provision to the controller 30 via the input device 13 or the communication device 32 of the station 11. The user then stops his or her car at any of the stations 11 and connects the power plug 12 to his or her car. The controller 30 reads an identifier (vehicle number) of the vehicle connected to the power plug 12 from an image of the camera 14 installed in each station 11, and recognizes the vehicle of the user. In addition, the controller 30 detects that the vehicle is connected to the power plug 12 by data of a sensor provided in the power plug 12. The controller 30 recognizes the user's vehicle and, upon detecting that the vehicle is connected to the power plug 12, starts the process of FIGS. 2 and 3.

The controller 30 executes the step S22 when the user's vehicle is a charging-requesting vehicle, and executes the step S23 when the user's vehicle is a power-providing vehicle (step S21). When the vehicle of the user is an electric power providing vehicle, the electric power plug 12 connected to the vehicle is referred to as a first electric power plug. When the vehicle of the user is a vehicle requiring charging, the power plug 12 connected to the vehicle is referred to as a second power plug.

The controller 30, which has detected that the power plug 12 (second power plug) is connected to the charging-requesting vehicle, waits until the power providing vehicle is connected to another power plug 12 (first power plug) (step S22: NO). When the power providing vehicle that provides power visits the power sharing system 10 and detects that another power plug 12 (first power plug) is connected to the power providing vehicle (step S22: YES), the controller 30 connects the first power plug to the input terminal 21 of the power regulator 20 and connects the second power plug to the output terminal 22 (step S24). The controller 30 drives the power regulator 20 so that power flows from the input-end 21 to the output-end 22 (step S24).

On the other hand, the controller 30 that has detected that the power plug 12 (first power plug) is connected to the power providing vehicle waits until the charge requesting vehicle is connected to another power plug 12 (second power plug) (step S23: NO). When the charging request vehicle requesting charging visits the electric power sharing system 10 and detects that another electric power plug 12 (second electric power plug) is connected to the charging request vehicle (step S23: YES), the controller 30 connects the first electric power plug to the input terminal 21 of the power regulator 20 and connects the second electric power plug to the output terminal 22 (step S24). The controller 30 drives the power regulator 20 so that power flows from the input-end 21 to the output-end 22 (step S24).

In this way, direct charging from the power providing vehicle (the power supply of the vehicle) to the charging requesting vehicle (the battery of the vehicle) starts.

When the power that has passed through the power regulator 20 reaches the target charge amount of the charging-requesting vehicle connected to the second power plug (FIG. 3, step S31: YES), the controller 30 disconnects the first power plug and the second power plug from the power regulator 20, and stops the power regulator 20 (step S32). Alternatively, when the power that has passed through the power regulator 20 reaches the target power supply amount of the power providing vehicle connected to the first power plug (step S34: YES), the controller 30 disconnects the first power plug and the second power plug from the power regulator 20, and stops the power regulator 20 (step S35).

If the power that has passed through the power regulator 20 has reached the target power supply amount but has not reached the target power supply amount, the controller 30 waits for another second power plug to be connected to another charging requesting vehicle (step S31: YES, S33: NO, S23). In the exemplary embodiment of FIG. 1, the power providing vehicle was a vehicle 50a. For example, when another charging request vehicle is connected to the power plug 12c of the station 11c in FIG. 1 (step S23: YES), the controller 30 closes the input relay 23a between the power plug 12a (first power plug) connected to the vehicle 50a that has not reached the target power supply amount and the input terminal 21 again, closes the output relay 24c between the power plug 12c (new second power plug) and the output terminal 22, and drives the power regulator 20 (step S24). In this way, the remaining power supply requirement of the vehicle 50a is sent to the vehicle that is newly connected to the power plug 12c.

If the power that has passed through the power regulator 20 has not reached the target charge amount but has reached the target power supply amount, the controller 30 waits for another first power plug to be connected to another power providing vehicle (step S31: NO, S34: YES, S22). In the exemplary embodiment of FIG. 1, the vehicle requiring charge was a vehicle 50b. For example, when another power providing vehicle is connected to the power plug 12c of the station 11c of FIG. 1 (step S22: YES), the controller 30 closes the output relay 24b between the power plug 12b (second power plug) and the output terminal 22 connected to the vehicle 50b that has not reached the target charge amount, closes the input relay 23c between the power plug 12c (new first power plug) and the input terminal 21, and drives the power regulator 20 (step S24). In this way, electric power is supplied from the vehicle newly connected to the power plug 12c to the vehicle 50b.

When the electric power that has passed through the power regulator 20 reaches the target charge amount and the target power supply amount at the same time, the controller 30 ends the process (step S31: YES, S32, S33: YES, END).

When the power sharing system 10 includes a plurality of power plugs 12 and the vehicle is connected to each of the plurality of power plugs 12, the charging-requesting vehicle and the power-providing vehicle are connected one after another via the power regulator 20, and the battery of the charging-requesting vehicle is charged by the power supply of the power-providing vehicle.

If the power sharing system 10 includes a plurality of power regulators 20, and each of the plurality of power plugs 12 is connected to each of the plurality of power regulators 20 via a relay, the plurality of charging request vehicles are simultaneously charged by the plurality of power providing vehicles.

In the power sharing system 10 of the first embodiment, electric power is directly sent from the power providing vehicle to the charging requesting vehicle. The power sharing system 10 of the first embodiment does not require a battery for temporarily storing electric power.

Example 2

Since the power sharing system 10 of the first embodiment does not include a battery for temporarily storing electric power, if the total amount of the target power supply amount and the total amount of the target charge amount do not coincide with each other, an automobile that cannot satisfy the target charge amount or the target power supply amount appears. Therefore, the power sharing system 10a of the second embodiment includes a battery 25 that temporarily stores electric power. The battery 25 is connected to the input terminal 21 of the power regulator 20 via the input relay 23d, and is connected to the output terminal 22 via the output relay 24d (see FIG. 1). The battery 25 functions as a spare power providing vehicle and a charging request vehicle. The structure of the power sharing system 10a of the second embodiment is the same as the structure of the power sharing system 10 of the first embodiment except that the battery 25 and the relay 24a, 24b are provided. However, the power sharing process executed by the controller 30 differs between the first embodiment and the second embodiment.

When the controller 30 detects that the charging request vehicle is connected to the second power plug but the power providing vehicle is not connected to the first power plug, it connects the battery 25 to the input terminal 21 and connects the second power plug connected to the charging request vehicle to the output terminal 22. Specifically, the controller 30 closes the input relay 23d between the battery 25 and the input terminal 21, and closes the output relay between the second power plug connected to the vehicle requesting charge and the output terminal 22. In this way, the battery 25 charges the vehicle requiring charging.

In a case where it is detected that the charging request vehicle is connected to the second power plug but the power providing vehicle is not connected to the first power plug, the controller 30 may connect the battery 25 to the input terminal 21 and connect the second power plug connected to the charging request vehicle to the output terminal 22 after a predetermined standby time has elapsed. If it is expected that the vehicle will frequently come to the power sharing system 10, the battery 25 may not be connected for a while (for a predetermined waiting time) and the power providing vehicle may be waited.

Further, when the controller 30 detects that the power providing vehicle is connected to the first power plug after the battery 25 is connected to the input terminal 21, the controller may disconnect the battery 25 from the input terminal 21 and connect the first power plug to which the power providing vehicle is connected to the input terminal 21. When a new electric power providing vehicle appears while the charging request vehicle is being charged by the battery 25, the charging by the new electric power providing vehicle is switched. Such processing reduces the usage time of the battery 25 and at the same time increases the efficiency of power share.

Conversely, if the controller 30 detects that the power providing vehicle is connected to the first power plug but the charging request vehicle is not connected to the second power plug, it connects the battery 25 to the output terminal 22 and connects the first power plug connected to the power providing vehicle to the input terminal 21. Specifically, the controller 30 closes the output relay 24d between the battery 25 and the output terminal 22, and closes the input relay between the first power plug connected to the power providing vehicle and the input terminal 21. In this way, the power of the power providing vehicle is transferred to the battery 25.

In a case where it is detected that the power providing vehicle is connected to the first power plug but the charging request vehicle is not connected to the second power plug, the controller 30 may connect the battery 25 to the output terminal 22 and connect the first power plug connected to the power providing vehicle to the input terminal 21 after a predetermined standby time has elapsed. If it is expected that the vehicle will frequently come to the power sharing system 10, the battery 25 may not be connected for a while (for a predetermined waiting time) and the charging request vehicle may be waited.

Further, when the controller 30 detects that the charging request vehicle is connected to the second power plug after the battery 25 is connected to the output terminal 22, the controller may disconnect the battery 25 from the output terminal 22 and connect the second power plug to which the charging request vehicle is connected to the output terminal 22. When a new charging request vehicle appears while the electric power of the electric power providing vehicle is transferred to the battery 25, the electric power supply destination of the electric power providing vehicle is switched from the battery 25 to the new charging vehicle. Such processing reduces the usage time of the battery 25 and at the same time increases the efficiency of power share.

The power sharing process executed by the controller 30 of the power sharing system 10*a* of the second embodiment will be described referring to the flow chart of FIG. 4-7. In the following description, "connecting the first power plug to the input terminal 21 of the power regulator 20" means closing the input relay 23 between the first power plug and the input terminal 21. "Disconnecting the first power plug from the input terminal 21" means opening the input relay 23 between the first power plug and the input terminal 21. Also, "connecting the second power plug to the output terminal 22 of the power regulator 20" means closing the output relay 24 between the second power plug and the output terminal 22. By "decoupling the second power plug from the output terminal 22" is meant opening the output relay 24 between the second power plug and the output terminal 22.

In addition, "connecting the battery 25 to the input terminal 21 (output terminal 22) of the power regulator 20" means closing the input relay 23*d* (output relay 24*d*) between the battery 25 and the input terminal 21 (output terminal 22). "Disconnecting the battery 25 from the input terminal 21 (output terminal 22) of the power regulator 20" means opening an input relay 23*d* (output relay 24*d*) between the battery 25 and the input terminal 21 (output terminal 22).

As described above, the user inputs the identifier (vehicle number) of the own vehicle and the intention to request charging or provide power to the controller 30 via the input device 13 or the communication device 32 of the station 11. The user then stops his or her car at any of the stations 11 and connects the power plug 12 to his or her car. The controller 30 reads an identifier (vehicle number) of the vehicle connected to the power plug 12 from an image of the camera 14 installed in each station 11, and recognizes the vehicle of the user. In addition, the controller 30 detects that the vehicle is connected to the power plug 12 by a sensor of the power plug 12. Upon recognizing the user's vehicle and detecting that the power plug 12 is connected to the vehicle, the controller 30 starts the process of FIGS. 4-7.

The controller 30 executes the step S42 when the user's vehicle is a charging-requesting vehicle, and executes the step S44 when the user's vehicle is a power-providing vehicle (step S41). As in the first embodiment, when the vehicle of the user is an electric power providing vehicle, the electric power plug 12 connected to the vehicle is referred to as a first electric power plug. When the vehicle of the user is a vehicle requiring charging, the power plug connected to the vehicle is referred to as a second power plug.

If the user's vehicle is a charging-requesting vehicle, the controller 30 checks whether or not there is a vehicle (power providing vehicle) that has been powered to the battery 25 via the power regulator 20 (step S42). An automobile that is powering the battery 25 is present when step S42 is executed, when an electric power providing vehicle is present, the electric power plug (first electric power plug) is connected to the automobile, the first electric power plug is connected to the input terminal 21 of the power regulator 20, and the battery 25 is connected to the output terminal 22 of the power regulator 20.

If there is a vehicle powering the battery, the controller 30 disconnects the battery 25 from the output terminal 22 of the power regulator 20 and connects the power plug 12 (second power plug) connected to the charge requesting vehicle to the output terminal 22 (step S43). In this way, the newly visited charging request vehicle is charged by the electric power of the electric power providing vehicle that has been supplied to the battery 25. After step S43, the controller 30 proceeds to step S51 of FIG. 5.

In the process of the step S41, if the user's vehicle is an electric power providing vehicle, the controller 30 checks whether there is a vehicle (charging-requesting vehicle) that has been supplied with electric power from the battery 25 via the power regulator 20 (step S44). The case where there is an automobile supplied with electric power from the battery 25 is a case in which a charging-requesting vehicle is already present at the time of executing the step S44, the electric power plug (second electric power plug) is connected to the vehicle, the second electric power plug is connected to the output terminal 22 of the power regulator 20, and the battery 25 is connected to the input terminal 21 of the power regulator 20.

If there is a vehicle powered by the battery, the controller 30 disconnects the battery 25 from the input terminal 21 of the power regulator 20 and connects the power plug 12 (first power plug) connected to the power supply vehicle to the input terminal 21 (step S45). In this way, the charging request vehicle that has received the electric power from the battery 25 receives the electric power supply from the newly visited electric power providing vehicle. After step S45, the controller 30 proceeds to step S51 of FIG. 5.

After the visited vehicle is found to be a charging-requesting vehicle in the step S41, if the vehicle supplying power to the battery 25 cannot be detected (step S42: NO), the process of the controller 30 proceeds to step S61 of FIG. 6. After the visited vehicle is found to be the electric power providing vehicle in the step S41, if the vehicle charged by the battery 25 cannot be detected (step S44: NO), the process of the controller 30 proceeds to step S71 of FIG. 7.

Figure 5:
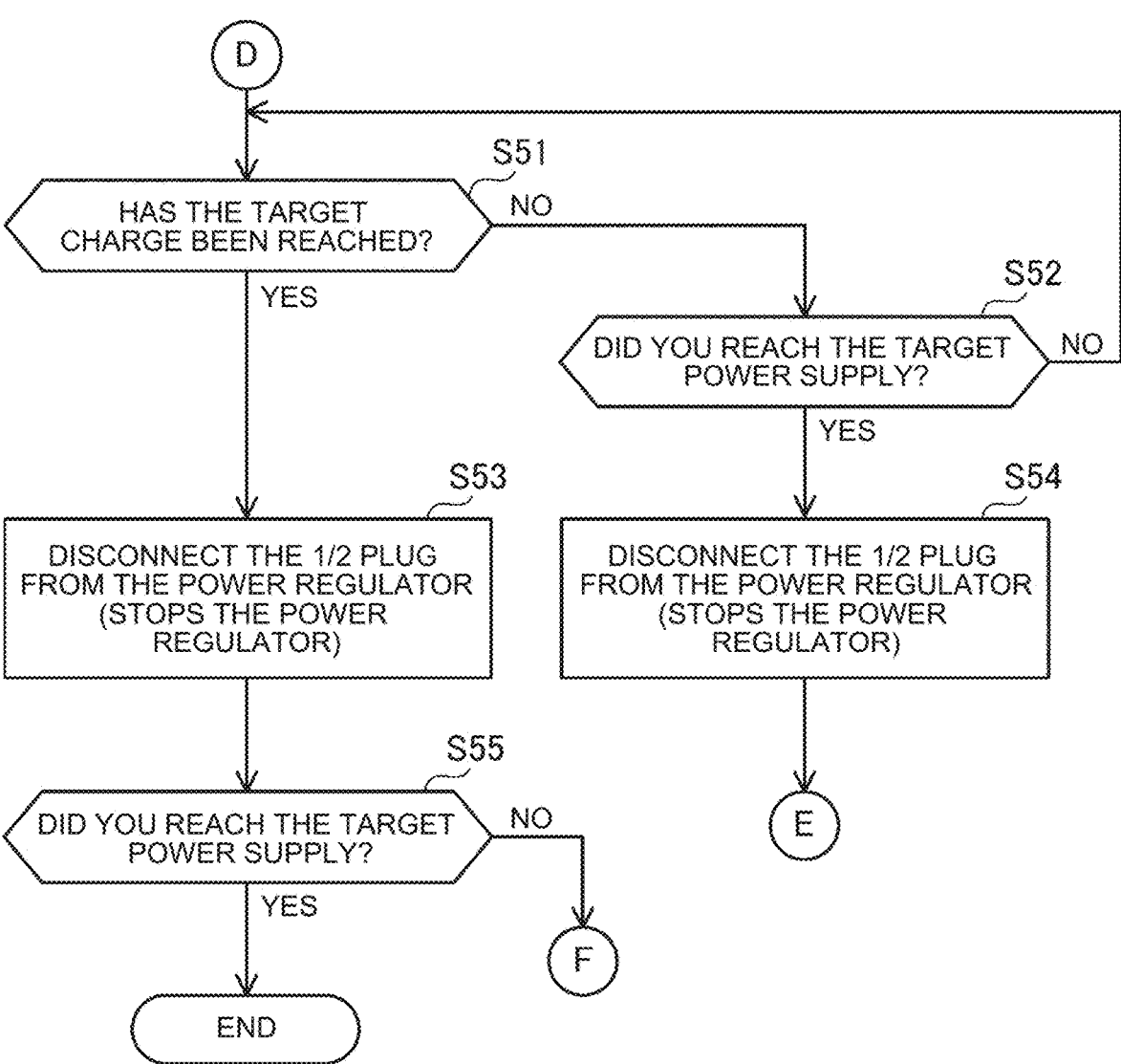
FIG. 5 is a flowchart of a power sharing process executed by a controller of the power sharing system according to the second embodiment (2)

The explanation will be continued from S51 of steps in FIG. 5. When step S43 or S45 is executed, the charging of the battery of the vehicle requesting charging by the power supply of the electric power providing vehicle is started. The controller 30 drives the power regulator 20 until the power passing through the power regulator 20 reaches either the target power supply amount of the power providing vehicle or the target charge amount of the charge requesting vehicle (step S51: NO, S52: NO).

If the power through the power regulator 20 reaches the target charge amount (step S51: YES) or if the target power supply amount is reached (step S52: YES), the controller 30 disconnects the first/second plugs from the power regulator 20 and deactivates the power regulator 20 (step S53 or S54). If the power passing through the power regulator 20 matches both the target charge amount and the target power supply amount, the controller 30 ends the process (step S51: YES, S55: YES, END).

When the power passing through the power regulator 20 has reached the target charge amount but has not reached the target power supply amount (step S51: YES, S55: NO), the process of the controller 30 proceeds to step S71 of FIG. 7. When the power passing through the power regulator 20 has not reached the target charge amount but has reached the target power supply amount (step S51: NO, S52: YES), the process of the controller 30 proceeds to step S61 of FIG. 6.

Figure 6:
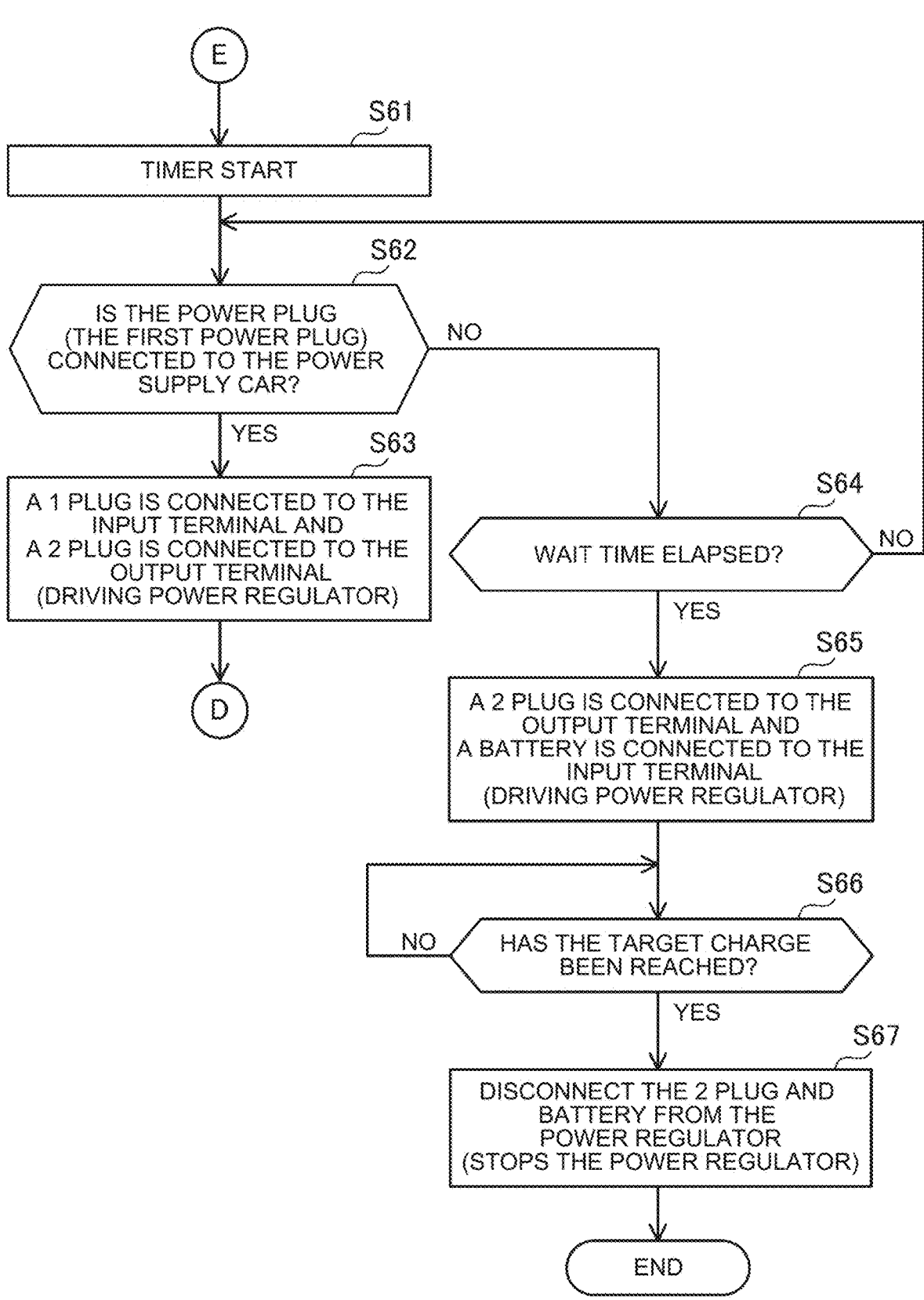
FIG. 6 is a flowchart of a power sharing process executed by a controller of the power sharing system according to the second embodiment (3)

The process of FIG. 6 is executed in the following two situations. One is when the vehicle requesting charging is detected in the step S41 and the vehicle supplying power to the battery 25 is not detected in the step S42. The other is when, in the process of FIG. 5, a vehicle (a vehicle requiring charging) that has not reached the target charging capacity remains (step S51: NO, S52: YES). In either case, it is a case where a charging request vehicle that has not reached the target charging amount remains.

Here, the controller 30 waits for a new power providing vehicle to appear for a certain waiting period (step S61, S62: NO, S64: NO). The waiting period is measured by a timer starting at S61 of steps. When a new power providing vehicle appears during the standby period and it is detected that the power plug 12 (first power plug) is connected to the vehicle (step S62: YES), the controller 30 connects the first power plug (power plug 12 connected to the power providing vehicle) to the input terminal 21 of the power regulator 20 and connects the second power plug (power plug 12 connected to the charging requesting vehicle) to the output terminal 22 (step S63). The controller 30 drives the power regulator 20. In this way, the battery of the vehicle requesting charging that has remained is charged by the power supply of the newly appearing vehicle providing power (step S63).

After the step S63, the process of the controller 30 returns to the step S51 of FIG. 5. The flowchart of FIG. 5 has already been described.

If no new power providing vehicle appears during the waiting period (S64: YES in steps), the controller 30 charges the battery of the remaining charge requesting vehicle with the battery 25. That is, the controller 30 connects the second power plug (the power plug 12 connected to the remaining charge requesting vehicle) to the output terminal 22 of the power regulator 20, and connects the battery 25 to the input terminal 21 (step S65). Then, the battery 25 continues charging until the charge requirement is satisfied (step S66: NO). Once the charge requirement is met, the controller 30 disconnects the second plug- and battery 25 from the power regulator 20 and deactivates the power regulator 20 (step S66: YES, S67).

While the remaining battery of the charging request vehicle is being charged by the battery 25 (S66: NO in steps), when the new power providing vehicle arrives at the power sharing system 10, the controller 30 replaces the power plug 12 connected to the power regulator 20 so that the remaining battery of the charging request vehicle is charged by the power supply of the new power providing vehicle. The process corresponds to S41, S44, S45 of steps in FIG. 4.

The flow chart of FIG. 7 will now be described. The process of FIG. 7 is executed in the following two situations. One is when the power providing vehicle is detected in the step S41 and the vehicle charged by the battery 25 is not detected in the step S44. The other is when, in the process of FIG. 5, a vehicle (electric power providing vehicle) that has not reached the target power supply quantity remains (step S51: YES, S55: NO). In either case, the power supply vehicle that has not reached the target power supply amount remains.

The controller 30 then waits for a new charge-requesting vehicle to appear for a certain waiting period (step S71, S72: NO, S74: NO). The waiting period is measured by a timer starting at S71 of steps. When a new charging request vehicle appears during the standby time and it is detected that the power plug 12 (the second power plug) is connected to the vehicle (step S72: YES), the controller 30 connects the first power plug (the power plug 12 connected to the power providing vehicle) to the input terminal 21 of the power regulator 20, and connects the second power plug (the power plug 12 connected to the charging request vehicle) to the output terminal 22 (step S73). The controller 30 drives the power regulator 20. In this way, the remaining electric power of the electric power providing vehicle is used to charge the battery of the newly appearing electric power requesting vehicle (step S73).

After the step S73, the process of the controller 30 returns to the step S51 of FIG. 5. The flowchart of FIG. 5 has already been described.

If no new charge-requesting vehicle appears during the waiting period (S74: YES in steps), the controller 30 transfers power from the power supply of the remaining power providing vehicle to the battery 25. That is, the controller 30 connects the first power plug (the power plug 12 connected to the remaining power supply vehicle) to the input terminal 21 of the power regulator 20, and connects the battery 25 to the output terminal 22 (step S75). Then, power transmission from the power providing vehicle to the battery 25 is continued until the target power supply amount is satisfied (step S76: NO). When the target feed rate is satisfied, the controller 30 disconnects the first plug- and battery 25 from the power regulator 20 and shuts down the power regulator 20 (step S76: YES, S77).

While electric power is being transferred from the power source of the remaining electric power providing vehicle to the battery 25 (S76: NO in steps), when the new charging requesting vehicle arrives at the electric power sharing system 10, the controller 30 replaces the electric power plug 12 connected to the power regulator 20 so that the battery of the new charging requesting vehicle is charged with the electric power of the remaining electric power providing vehicle. The process corresponds to S41, S42, S43 of steps in FIG. 4.

The electric power sharing system 10*a* of the second embodiment does not use the battery 25 as much as possible, and directly charges the battery of the vehicle requiring charging with the power supply of the electric power providing vehicle. Since the usage times of the battery 25 included in the power sharing system 10*a* are kept low, the degradation of the battery 25 is small. In addition, since the electric power is transferred from the electric power providing vehicle to the charging request vehicle without passing through the battery 25, the power transmission loss is small.

Considerations regarding the power sharing system 10 and 10*a* of the embodiment will be described.

With multiple power plugs 12 and multiple power regulators 20, the power sharing system 10 can share power among multiple battery electric vehicles. For example, by introducing this power sharing system into an employee parking lot of a large factory, it is possible to effectively share electric power among the employees.

When this power sharing system is introduced into a parking lot for an employee of a company, it is also preferable to prepare a database in which information of an employee's vehicle (such as an automobile number, a charging request or a power supply request, a target charge amount (or a target power supply amount)) is associated with an identifier of the employee. After the employee enters the parking lot (or before entering the parking lot), the employee's identifier simply reads the stored employee ID card with the reader so that the power sharing system can provide a power sharing service to the employee's vehicle.

It is also preferable to provide various incentives to the user so that the user can actively utilize the power sharing system. The incentive may be money or a point that can be exchanged for money or goods.

A user may be allowed to reserve the station 11 in advance. The user can then register the required data in advance in the power sharing system 10 (10*a*). The necessary information includes, for example, a time for using the station 11, a selection of a charging request or a power supply request, a target charge amount (or a target power supply amount), an identifier of the own vehicle (vehicle number), and the like. The information input by the user is sent to the controller 30 via the Internet, for example. The controller 30 stores the received information in the storage device 31.

If the power of the battery 25 is insufficient, the battery 25 may be charged with a power source external to the power sharing system 10 (10a). Alternatively, when the battery 25 is fully charged, the power of the battery 25 may be transferred to the outside of the power sharing system 10 (10a).

The "input relay"/"output relay" of the embodiment may be replaced with "input-side switch"/"output-side switch".

While specific examples of the present disclosure have been described in detail above, these are merely illustrative and do not limit the scope of the claims. Various modifications and variations of the specific examples described above are included in the technology described in the claims. The technical elements described in this specification or in the drawings exhibit technical utility alone or in various combinations, and are not limited to the combinations described in the claims at the time of filing. Further, the technology illustrated in the present specification or the drawings can achieve a plurality of objects at the same time, and has technical usefulness by achieving one of the objects.

What is claimed is:

1. A power sharing system that supports vehicle-to-vehicle power transfer, the power sharing system comprising:
   a plurality of power plugs connectable to a vehicle, the power plugs including a first power plug and a second power plug;
   a power regulator that includes an input terminal and an output terminal and that outputs electric power input to the input terminal to the output terminal;
   a controller that connects the first power plug connected to a power providing vehicle to the input terminal and that connects the second power plug connected to a charging request vehicle to the output terminal, the power providing vehicle being a vehicle that provides electric power of an own vehicle, and the charging request vehicle being a vehicle that requests charging; and
   a battery, wherein when the controller detects that the charging request vehicle is connected to the second power plug but the power providing vehicle is not connected to the first power plug, the controller connects the battery to the input terminal and connects the second power plug connected to the charging request vehicle to the output terminal, wherein when the controller detects that the power providing vehicle is connected to the first power plug after connecting the battery to the input terminal, the controller disconnects the battery from the input terminal and connects the first power plug to which the power providing vehicle is connected to the input terminal.

2. The power sharing system according to claim 1, wherein when the controller detects that the charging request vehicle is connected to the second power plug but the power providing vehicle is not connected to the first power plug, the controller connects the battery to the input terminal and connects the second power plug connected to the charging request vehicle to the output terminal after a predetermined standby time has elapsed.

3. The power sharing system according to claim 1, further comprising a battery, wherein when the controller detects that the power providing vehicle is connected to the first power plug but the charging request vehicle is not connected to the second power plug, the controller connects the first power plug connected to the power providing vehicle to the input terminal and connects the battery to the output terminal.

4. The power sharing system according to claim 3, wherein when the controller detects that the power providing vehicle is connected to the first power plug but the charging request vehicle is not connected to the second power plug, the controller connects the first power plug connected to the power providing vehicle to the input terminal and connects the battery to the output terminal after a predetermined standby time has elapsed.

5. The power sharing system according to claim 3, wherein when the controller detects that the charging request vehicle is connected to the second power plug after connecting the battery to the output terminal, the controller disconnects the battery from the output terminal and connects the second power plug to which the charging request vehicle is connected to the output terminal.

6. A power sharing system that supports vehicle-to-vehicle power transfer, the power sharing system comprising:
   a plurality of power plugs connectable to a vehicle, the power plugs including a first power plug and a second power plug;
   a power regulator that includes an input terminal and an output terminal and that outputs electric power input to the input terminal to the output terminal;
   a controller that connects the first power plug connected to a power providing vehicle to the input terminal and that connects the second power plug connected to a charging request vehicle to the output terminal, the power providing vehicle being a vehicle that provides electric power of an own vehicle, and the charging request vehicle being a vehicle that requests charging; and
   a battery, wherein when the controller detects that the power providing vehicle is connected to the first power plug but the charging request vehicle is not connected to the second power plug, the controller connects the first power plug connected to the power providing vehicle to the input terminal and connects the battery to the output terminal, wherein when the controller detects that the charging request vehicle is connected to the second power plug after connecting the battery to the output terminal, the controller disconnects the battery from the output terminal and connects the second power plug to which the charging request vehicle is connected to the output terminal.

* * * * *